United States Patent Office 2,954,944
Patented Oct. 4, 1960

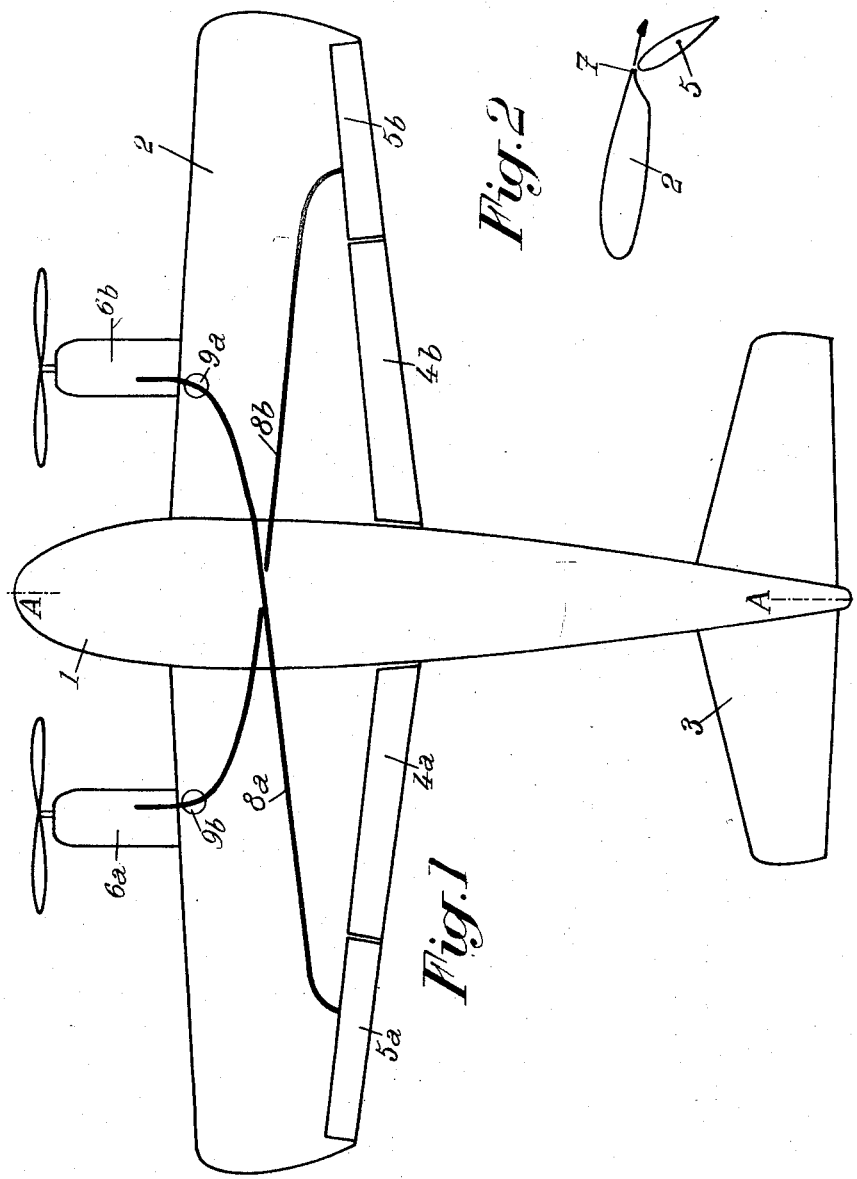

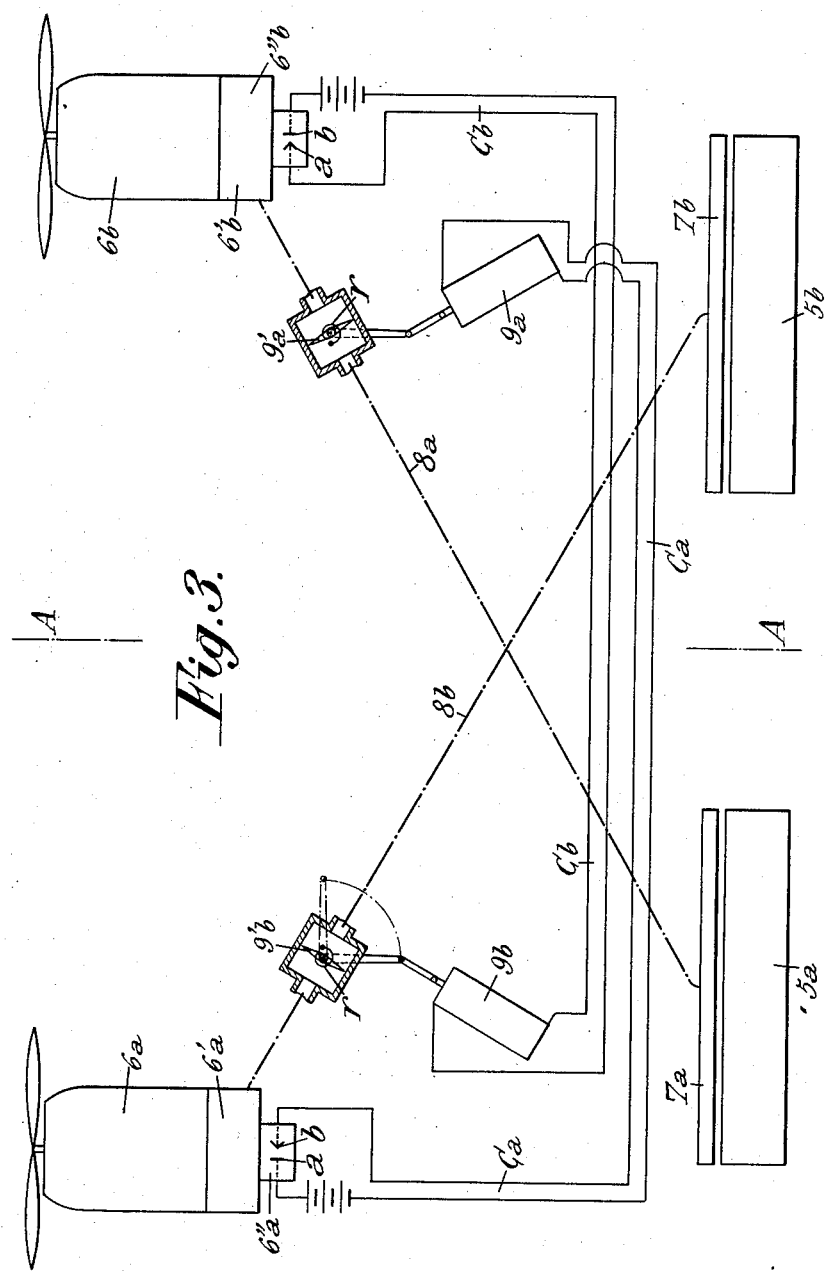

2,954,944

AIRCRAFT INCLUDING PROPELLING UNITS DISPOSED SYMMETRICALLY WITH RESPECT TO THE FORE-AND-AFT AXIS OF THE AIRCRAFT

Fernand Huet, Paris, France, assignor to Societe de Brevets H.D., Paris, France, a French society Filed June 13, 1958, Ser. No. 741,960

Claims priority, application France June 17, 1957

2 Claims. (Cl. 244—12)

This invention relates to aircraft including propelling units disposed symmetrically on either side of the fore-and-aft axis of the aircraft.

These propelling devices may be power plants including screw propellers driven either by piston engines or by turbines, or they may be jet engines. The number of these propelling units may be equal to 2, 4, 6, or any other even number.

In an aircraft of this kind, it may happen that a portion or the whole of the propelling units located on one side of the fore-and-aft axis of the aircraft stops running, for instance when the aircraft is taking off. The aircraft is then unbalanced and tends to yaw and to roll. The pilot opposes yawing by acting upon the rudder and rolling by acting upon the ailerons. However, it may happen that the action of the ailerons is not sufficient to restore the balance of the aircraft. Of course it would be possible to increase the dimensions of the ailerons. However, this would be effected at the cost of the dimensions of the lift increase flaps, and such a solution involves serious drawbacks.

The object of the present invention is to obviate the above disadvantages and in particular to enable the ailerons to perform the desired action without having to increase their dimensions.

According to the present invention, while the tendency of the aircraft to roll is opposed by lowering the aileron located on the same side of the longitudinal axis of the aircraft as the stopped propelling unit and lifting the other aileron, means are provided for blowing gas under pressure along the upper surface of the aileron that is lowered, said means being advantageously brought into action automatically in response to the stopping of the above mentioned propelling unit.

A preferred embodiment of the present invention will be hereinafter described with reference to the accompanying drawing, given merely by way of example and in which:

Fig. 1 is a diagrammatic plan view of an aircraft made according to the invention.

Fig. 2 is a side view of the wing of this aircraft and of one of the ailerons thereof in the lowered position.

Fig. 3 shows in detail the arrangement for blowing gas on the proper aileron.

The aircraft shown by the drawing includes a fuselage 1, a wing 2 extending on either side of said fuselage, a tail unit 3 at the rear end of fuselage 1, lift increase flaps 4a, 4b, and ailerons 5a, 5b provided along the trailing edge of wing 2.

This aircraft includes an even number of propelling units distributed symmetrically on either side of the fore-and-aft axis A—A of the aircraft. In the example shown, there are two of these propelling units 6a and 6b which include screw propellers driven by piston engines, turbines or generally any suitable power means. In what follows, it will be supposed that the propelling units 6a and 6b are turbo-propeller plants.

When one of the propelling units is stopped for instance due to a break-down, the tendency of the aircraft to roll is opposed by acting upon the ailerons 5a, 5b, the aileron located on the side of the propelling unit that has stopped being lowered, whereas the aileron located on the opposed side is lifted.

According to the present invention, in such an event, means are brought into action, preferably automatically, so as to blow a gas, preferably compressed air, on the upper surface of the lowered aileron so as to increase the efficiency of this aileron and to restore, at least approximately, the balance of the aircraft, a result which would not be sufficiently obtained if ailerons of the usual dimensions were merely actuated as above described.

Such an automatic control may be performed in various ways.

For instance, the propelling unit that has stopped may operate, by means of its torque-meter, a contact which supplies an electric current opening an electrically actuated valve inserted in a conduit extending between a source of air under pressure and a nozzle 7 (Fig. 2) capable of blowing an air stream on the upper surface of the aileron located on the same side as the propelling unit that has stopped. The torque-meter may be replaced by a speed governor or by a pressure responsive contactor operated in response to a pressure drop taking place when the corresponding propelling unit stops running, for instance under the effect of the lowering of the pressure in the compressor of the turbo-propeller engine.

Of course, instead of an electrically operated valve, I may use any other equivalent element capable of opening or closing a conduit and which may be controlled, for instance hydraulically or pneumatically, through suitable means brought into play by the stopping of one of the propelling units.

The source of compressed air is advantageously constituted by an air compressor belonging to the propelling unit that has kept running. For instance, the aileron 5a may be connected with the air compressor 6'b of the turbo-propeller engine 6b through a conduit 8a whereas aileron 5b is connected with the air compressor 6'a of the turbo-propeller engine 6a through a conduit 8b. Conduit 8a is controlled by a valve 9'a pivoted on an axis r and controlled by a solenoid 9a which is in a circuit Ca with contacts a, b controlled by the torque-meter 6"a of the motor 6a. Likewise, conduit 8b is controlled by a valve 9'b pivoted on an axis r and controlled by a solenoid 9b in a circuit Cb controlled by contacts a, b which are operated by the torque-meter 6"b of the engine 6b.

The valves 9'a and 9'b are normally held shut by a coil spring or the like.

This construction operates as follows:

As long as the motor 6b is turning and developing an adequate torque, contacts a and b which are controlled by the torque meter 6"b are open, and the valve 9'b remains closed. However, if the motor stops for any reason, contacts a, b are closed, which closes the electrical circuit Cb and causes the electromagnet 9b to open the valve 9'b. The air compressed by the blower 6'a which is still being driven by the motor 6a then feeds the nozzle 7b of the aileron 5b.

The function of the valve 9'a is similar, being controlled by the motor 6a to furnish air to the nozzle 7a if motor 6a stops.

Thus, the stopping of one of the propelling units automatically causes air under pressure to be blown on the upper surface of the aileron located on the side of the aircraft where is placed the stopped propelling unit, said aileron being lowered at this time.

When the propelling units are not constituted by turbo-propeller engines or by jet engines, but by piston engines, the source of compressed air for blowing air on the surface of the ailerons may be constituted by an auxiliary compressor driven by the engine that is still running, or by an accumulator of air under pressure.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft, in combination, a wing, two propelling units disposed symmetrically with respect to the fore-and-aft axis of said aircraft, and two ailerons mounted on said wing symmetrically with respect to said axis, so that rolling of the aircraft due to the stopping of one of said propelling units in flight while the other is running can be opposed by lowering that of said ailerons which is located on the same side of said axis as the stopped propelling unit and lifting the other aileron, means for blowing gas under pressure on the upper surface of each of said ailerons, said means being normally out of action, and means operative in response to the stopping of one of said propelling units for bringing into action the blowing means for the aileron located on the same side of said axis as said stopped propelling unit.

2. In an aircraft, in combination, a wing, two propelling units disposed symmetrically with respect to the fore-and-aft axis of said aircraft, each of said units including an air compressor, and two ailerons mounted on said wing symmetrically with respect to said axis, so that rolling of the aircraft due to the stopping of one of said propelling units in flight while the other is running can be opposed by lowering that of said ailerons which is located on the same side of said axis as the stopped propelling unit and lifting the other aileron, two nozzles, each mounted on the rear part of said wing and opening rearwardly toward the upper surface of one of said ailerons respectively, a conduit connecting each of said nozzles respectively with the output of the air compressor of the propelling unit located on the other side of said axis from said nozzle, a valve normally closing each of said conduits, and means operative by the stopping of one of said propelling power plants for opening that of said valves which is located in the conduit starting from the air compressor of the other propelling unit.

References Cited in the file of this patent
UNITED STATES PATENTS 2,469,902  Stalker ---------------- May 10, 1949